Aug. 4, 1959

R. W. HAMILTON 2,897,938

AUTOMATIC PARKING METERS

Filed May 24, 1956

R.W. HAMILTON
*INVENTOR.*

BY

ATTORNEY

Aug. 4, 1959 R. W. HAMILTON 2,897,938
AUTOMATIC PARKING METERS
Filed May 24, 1956 6 Sheets-Sheet 3

R.W. HAMILTON
INVENTOR.

BY *G. M. McKeight*

ATTORNEY

Aug. 4, 1959 R. W. HAMILTON 2,897,938
AUTOMATIC PARKING METERS

Filed May 24, 1956 6 Sheets-Sheet 4

R. W. HAMILTON
*INVENTOR.*

BY

ATTORNEY

Aug. 4, 1959  R. W. HAMILTON  2,897,938
AUTOMATIC PARKING METERS
Filed May 24, 1956  6 Sheets-Sheet 5

R.W. HAMILTON
INVENTOR.

BY
ATTORNEY

R. W. HAMILTON
INVENTOR.

ATTORNEY

United States Patent Office 2,897,938
Patented Aug. 4, 1959

2,897,938

AUTOMATIC PARKING METERS

Robert W. Hamilton, Oklahoma City, Okla., assignor to Magee-Hale Park-O-Meter Company, Oklahoma City, Okla., a corporation of Delaware Application May 24, 1956, Serial No. 587,114

4 Claims. (Cl. 194—72)

This invention relates to an automatic parking meter for indicating parking time on city streets, parking lots, or parking spaces and the like, and more particularly, but not by way of limitation, to an automatic parking meter which is operable by one or more denominations of coins and which will operate by multiple coins of each of a selected or variable denomination, in a manner to accumulate the time by a subsequent insertion of a coin during the operation of a meter that already shows time indicated thereon.

This application is an improvement over the prior United States of America patents to G. A. Hale, No. 2,532,906, issued December 5, 1950, and No. 2,625,250, issued January 13, 1953, respectively, as well as an improvement over applicant's co-pending application Serial No. 565,855, filed February 16, 1956, and entitled "Multiple Coin Parking Meter."

A parking meter operates in all weather conditions, and a great number of present day parking meters depend on gravity to drop the coin through a coin chute in order to operate at least certain phases of the meter operation. It becomes apparent that any gravity operation is subject to weather conditions, such as infiltrated moisture, freezing rain, dust, and the like having a detrimental effect on the operation of the meter. Furthermore, there are many present day meters utilizing a multiple coin operation wherein the coins may be of variable denominations, such as a penny and nickel, such as the prior patents to Hale above mentioned.

The present invention broadly is concerned with an automatic parking meter which starts its operation through a coin tripping a latch when inserted into the machine by the operator's finger. The machine may be selectively operated by a plurality of variable sized coins or coins of numerous denominations, as well as multiple coins of each of the sizes or denominations. The indicating time is set by a predetermined stop mechanism operating with a coin setting lever wherein the time indicator is released from a driving connection with a clock train to be allowed to return to a starting or time indicating position under the energy of a spring. The time indicating position is regulated by the stop mechanism in accordance with the size or denomination of the coin or coins. The time indicator after being set is moved in one direction with the clock-driven connection gear train to show utilization of the selected time.

It is an important object of this invention to provide an automatic parking meter which is operable on a plurality of coins of variable sizes, or denominations, as well as multiple coins of each size or denomination.

It is a further object of this invention to provide an automatic parking meter which can be infinitely adjusted for operation with various combinations of coins of variable sizes or denomination, and a multiple of such variable coins to provide any desired length of parking time complementary to the value of the coins or the multiple coins utilized.

A further object of this invention is to provide a fully automatic parking meter which is operable on at least four coins of variable sizes and denominations.

Still another object of this invention is to provide a parking meter which may be adjustable to provide for any desired length of parking time through insertion of a multiple of variable sized coins or coins of variable denominations, although there may not be a sequential relationship between the value of the coin and its physical size in comparison to other coins in the operating series.

And still another object of this invention is to provide an automatic parking meter which is operable on two or more coins or multiples of coins of variable sizes or denominations giving full indicating time in complement to the value of the coin upon insertion.

A further object of this invention is to provide a parking meter mechanism that may be modified to permit use of a ten cent United States coin in present day penny-nickel parking meters.

And still another object of this invention is to provide an automatic parking meter which is operable on two or more coins or multiples of each of said coins of variable sizes or denominations and which may be adjusted to vary the time indication of the coins and of each particular size of coins to various combinations.

An additional object of this invention is to provide an automatic parking meter which has a power driven element released through insertion of the coin into the mechanism which operates to re-set a time indicator in complement to the value of the coin and will also display the coin to decrease the possibility of utilizing slugs in the mechanism.

And still another object of this invention is to provide an automatic parking mechanism wherein the mechanism for re-setting the time indicator is released to operate, and not forcibly moved through a fixed distance.

And still another object of this invention is to provide an automatic parking mechanism which allows immediate re-setting of a time indicator upon the successive insertion of multiple coins of like or different denominations and which is adjustable to provide for numerous combinations of each denomination of coin.

And still another object of this invention is to provide an automatic parking meter having a time indicator re-setting mechanism for moving the time indicator from one position to another relative to the time scale, and which will cumulate the time upon each re-setting of the time indicator irrespective of the starting position of the indicator.

And a further object of this invention is to provide a selective coin automatic parking meter adapted for cumulating time in the time indicating mechanism in accordance with the size or denomination of coin utilized, and wherein the meter is automatic and more durable in its operation, simple in construction, and facilitates the maintenance and any adjustment thereof.

And still another object of this invention is to provide an automatic parking meter which is operable to provide variable increments of time registration for a plurality of coins of various size and particularly to provide full registration of time for coins of smaller diameter but greater value contemporaneous with coins of larger diameter but of lesser as well as larger value.

And still another object of this invention is to provide an automatic parking meter that will accept more than two coins of variable size and variable denominations to provide variable time registration therefor.

And still another object of this invention is to provide an automatic parking meter accepting more than two coins of variable size through a single coin slot to provide time registration for the meter.

And still another object of this invention is to provide an automatic parking meter accepting more than two coins of variable size and denomination through a single coin slot for multiple and variable time registrations thereof.

Other objects and advantages of the invention will be evident from the following detailed description, read in conjunction with the accompanying drawings, which illustrate my invention.

Figure 1:
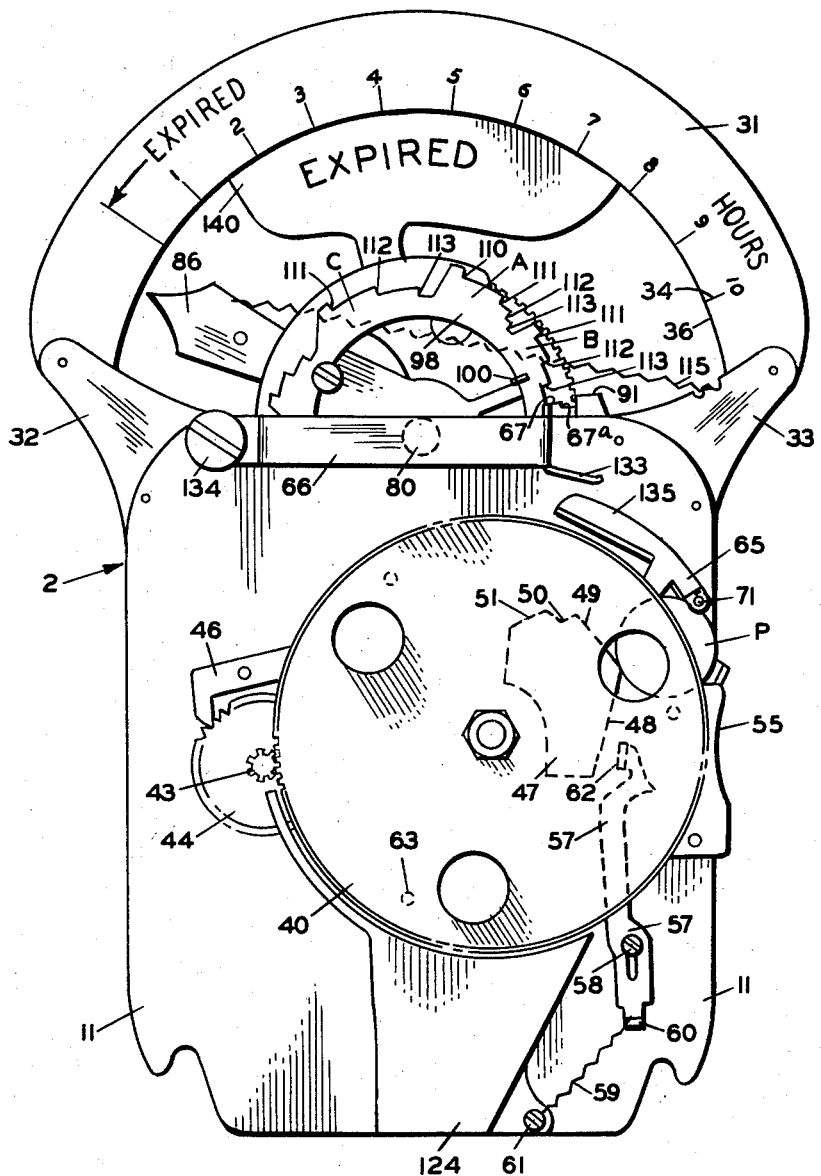
Figure 1 is a diagrammatic front elevational view of the parking meter mechanism with certain parts broken away and showing some of the elements in normal position before the insertion of a United States one cent coin.
Figures 6, 7, 10:
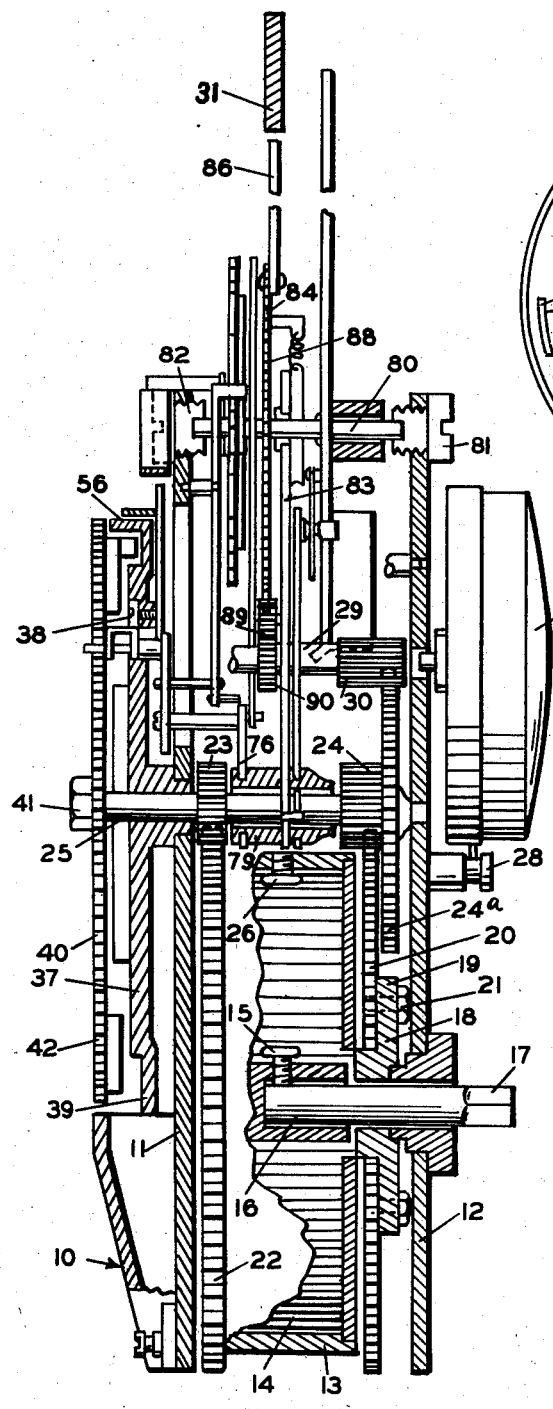
Figure 6 is a side elevational view mainly in vertical section taken from the right hand side of Fig. 1 and with certain parts omitted for clarity.
Figure 7 is an elevational view of the rear face of the rotator plate.
Figure 10 is a front view of the index ring.
Figures 8, 9:
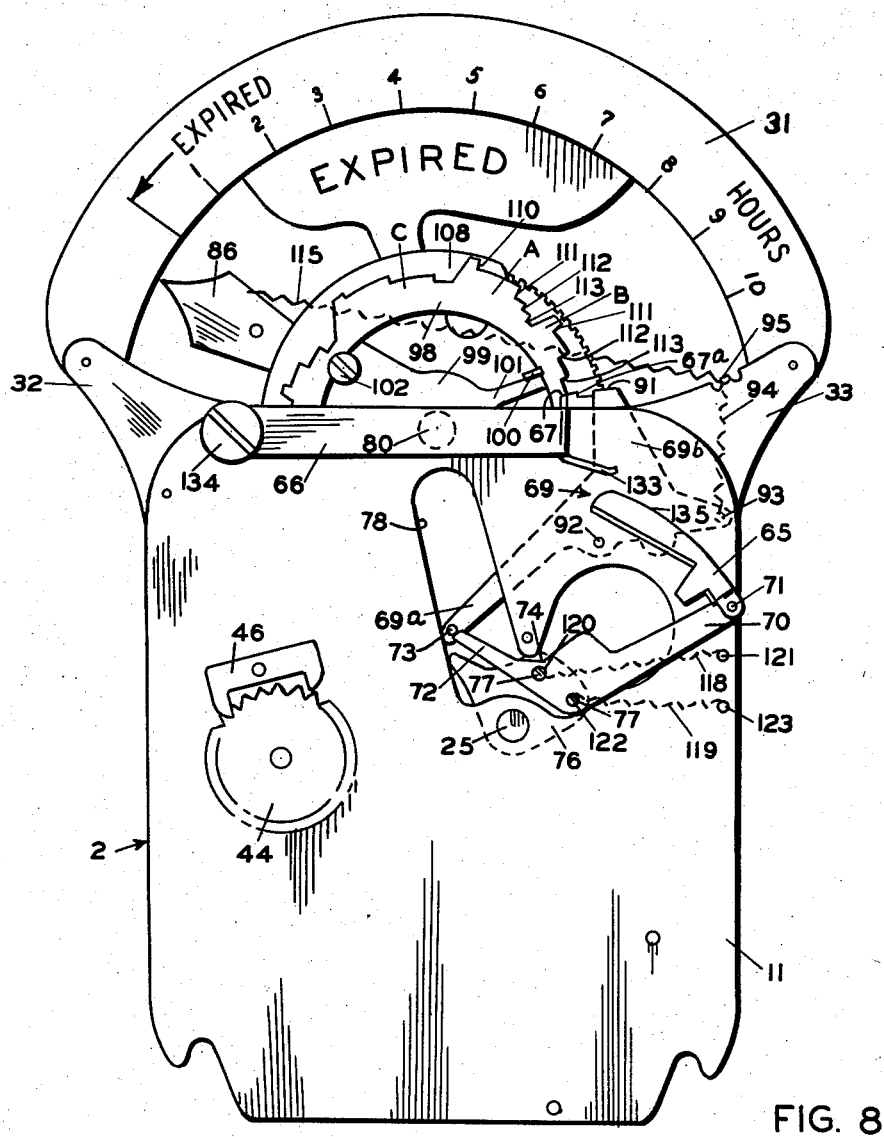
Figure 8 is a view similar to Fig. 1, but with the rotator plate and other parts omitted for clarity, depicting the indicator re-set mechanism at starting position.
Figure 9 is a perspective view of the coin operating lever.

Referring to the drawings in detail, and more particularly to Figs. 1, 6 and 8, reference character 10 designates a parking meter mechanism generally adapted to be encased as a unit in a suitable housing (not shown) which forms no part of the present invention. The mechanism comprises a pair of spaced plates wherein the front plate 11 (Fig. 6) in conjunction with the rear plate 12 provide an outer frame work for the parking meter mechanism. A main spring housing 13 is disposed in any suitable manner between the plates 11 and 12 and includes a main spring 14 suitably anchored at one end by a set screw 15 to a shaft 16. The shaft 16 is disposed in any suitable manner at opposite ends (not shown) in the plates 11 and 12 respectively. The rear end of the shaft 16 extends outwardly from the plate 12 and is provided with a square end 17 for receiving any suitable winding key to cause rotation of the shaft and thereby winding of the main spring 14 when desired. The shaft 16 is free to rotate in its mounting upon winding of the spring, and is provided with a ratchet 18 fixed to the shaft 16 in any suitable manner at a position adjacent one side wall of the barrel 13. The ratchet 18 cooperates with a set of pawls 19, only one of which is shown, secured to a large gear 20 by suitable studs 21.

The circular outer edge of the front plate of the housing 13 is provided with a plurality of gear teeth 22 adapted to engage with a connecting gear member 23 forming part of a gear train for a purpose as will be hereinafter set forth. The gear 20 is rotatably carried by the ratchet 18, as will be noted in Fig. 6, and is slightly spaced from the housing 13. The gear 20 is in engagement with a freely rotatable pinion and gear 24 mounted on a main drive shaft 25 disposed between the plates 11 and 12. The shaft 25 is normally rotatable between the plates 11 and 12 and carries the fixed gear 23 therewith.

The pinion 24 is freely mounted on the shaft 25. As will be noted in Fig. 6, one end of the spring 14 is anchored to the shaft 16 by the set screw 15, while the opposite end is anchored to the barrel housing 13 through a set screw 26 as shown. It will be apparent that the spring barrel 13 drives the pinion 23 and shaft 25 through the large gear 22, whereas the compound gear 24, 24a is driven by the large gear 20 which in turn is driven by the other end of the spring 14 through the set screw 15, shaft 16 and ratchet 18.

A suitable timer or clock works 27 is secured by locking studs 28 to the rear of the plate 12. A clock shaft 29 extends from the clock mechanism 27 and is disposed between the plates 11 and 12. The shaft 29 as shown in Fig. 6 is broken for purposes of clarity. The shaft 29 is provided with a pinion 30 adapted to mesh with the compound gear 24, thereby providing a driving connection for the clock works 27 from the main spring 14. Referring to Fig. 1, a dial member 31 of substantially arcuate configuration and extending through an arc of approximately one hundred twenty degrees is disposed above the plates 11 and 12 by opposite extension flanges 32 and 33 adapted to be secured in any suitable manner (not shown) at opposite sides of the space plates 11 and 12. Both front and rear faces of the dial 31 are scaled as at 34 to show the total time registrations required. It will be apparent that as many variations may be provided as is desired and may vary from a few minutes to several hours, depending upon the particular requirements. In the present disclosure, the dial has been shown in Figs. 1 to 5 as depicting a ten hour scale and divided into one hour intervals. The dial 31 is provided with a cut away or apertured portion 36 for convenience and lightness.

Referring to Fig. 6, the main shaft 25 extends through the front plate 11 and its outer end and is adapted to receive a circular coin pan 37 fixed to the front plate 11 in any suitable manner, preferably by stud members 38. The coin pan is provided with a circular recessed portion 39 for a purpose as will be hereinafter set forth. On the extreme outer end of the shaft 25 there is provided a coin propelling or coin rotator plate 40 disposed in horizontal spaced relation to the coin pan 37. It will be apparent that the pan 37 is also slightly spaced from the plate 11 and the coin rotator plate may be secured to the shaft 25 by a suitable nut 41. The gear 22 is rotatable and meshes with the pinion gear 23 mounted on the shaft 25 to provide a driving connection for the coin rotator plate 40 from the energy of the main spring 14. The outer circumferential periphery of the rotator plate 40 is provided with a plurality of gear teeth 42 adapted to mesh with a gear 43 of a speed limiting device comprising a star wheel gear unit 44 and a cooperating pivotal detent member 46 much in the same manner as applicant's copending application heretofore mentioned. From the foregoing, it will be apparent that the main spring 14 provides a source of energy for both the clock works 27 and the coin rotating plate 40, the function of which will be hereinafter set forth. The front face of the coin pan 37 is provided with a raised boss having a cut-away portion (neither of which is shown) adjacent which is disposed a cam member 47 (shown in dotted lines in Figs. 1, 2 and 5 behind the rotator plate 40). The cam 47 is preferably of an odd shaped configuration, as shown, and is fixed to the coin pan 37 by any suitable means (not shown). The configuration of the cam is such that it is provided with a substantially vertical straight face 48 (Fig. 1) at one side communicating with a slightly inclined face 49 in turn communicating with a recessed portion 50 communicating with a second inclined portion 51 disposed in a direction substantially ninety degrees from that of the inclined face 49, all for a purpose as will be hereinafter set forth. The back face of the coin rotator plate 40 (Fig. 7) is preferably provided with a plurality (preferably three, but not limited thereto) of circumferentially spaced coin catch members 52, each having a hook or pin member 53 at one end thereof. The outer end of the pin is preferably curved or circular in shape as shown in Fig. 7 for a purpose as will be hereinafter set forth. A plurality of spaced apertures 54 are provided as coin display windows in the rotator plate 40. A slot portion 55 (Figs. 1 and 6) is provided between the rotator plate 40 and the coin pan 37 acting as a coin slot for receiving the coins as will be hereinafter set forth.

The coin pan 37 is preferably provided with a circumferential rim or outwardly extending flange member 56 (Fig. 6) assisting in maintaining coins inserted in the mechanism moving in a circular path between the rotator plate 40 and the coin pan 37. The rim 56 extends substantially through a greater portion of the circumference of the pan 37, however, certain circumferential portions thereof are omitted in proximity of the trip lever 57 and the coin slot 55 to provide an aperture for the reception of the coins. The coin trip lever 57 is shown partly in dotted lines in Fig. 1 and is pivotally mounted on the front plate 11 by a pin 58. The return action is provided through a spring 59 anchored at one end 60 to the lever 57 and at the opposite end to a stud 61 provided in the plate 11. The spring 59 normally tends to rotate the lever 57 in a clockwise direction as shown. The top portion of the lever 57 is provided with an outwardly extending projection or flange portion 62 adapted to contact one of the pins 53 preferably spaced one hundred twenty degrees apart on the inner face of the rotator plate 40, but not limited thereto, and acting as a release pin in a manner similar to that disclosed in applicant's co-pending application heretofore referred to. The front plate of the rotator plate is also provided with a plurality of circumferentially spaced studs or pins 63 preferably spaced one hundred twenty degrees apart, but not limited thereto. The studs 63 are preferably disposed in about a media circumferential position relative to the release pins 53. It will be apparent that the spacing of the oppositely sided pins 53 and 63 may be variable, but the present disposition assures that a plurality of coins of substantially any diameter may be carried through the mechanism in one complete cycle of revolution of the rotator plate 40. The variance of the pin spacing may be between ninety and one hundred twenty degrees, depending upon the number of coins utilized and may be varied as desired.

As a coin is inserted and moved through the slot 55 by the pressure of the operator's finger, the coin trip lever 57 is pivoted in a counterclockwise direction by contact of the coin with the flange 62 and thus moves to a position substantially as shown in Fig. 1, whereupon the flange portion 62 has been moved out of contact (not shown) with a stop pin 53, thereby permitting rotation of the rotator plate 40 in a counter-clockwise direction under action of the main spring 14 in substantially the same manner as has been previously described in applicant's copending application. As the rotator plate is propelled counter-clockwise, the pins 53 are permitted to engage the circumference of the inserted coin which upon insertion through the slot 55 was supported by the pins 53 and brought into engagement with the right hand face of the cam so that the coin may be propelled simultaneously in a counter-clockwise direction with that of the plate 40 and at a constant speed as determined by the speed limiting device 44.

Movement of the inserted coin in a counter-clockwise direction will bring it into contact with a by-pass arm or lever 65 adapted to operate a pivotal lever 66 having an inwardly directed flange (not shown) having an integral pawl 67 disposed at right angles thereto and provided with a tooth 67a (Fig. 2) acting as a block-out pawl to prevent operation of the index pawl 91 of a bell crank indexing lever 69 (Fig. 8). It will be apparent that the bell crank indexing lever 69 is disposed to the rear of the front plate 11, and a portion thereof is shown in dotted lines for purposes of clarity. The by-pass lever 65 is pivoted to the coin re-set lever 70 through a pin 71 (Fig. 8) and rests upon flange 56 of the coin pan 37 and the re-set lever 70 has an extension leg 72 cooperating with a pin 73 provided on one leg of the index crank 69 to provide variable settings of the cumulative indexing mechanism as will be hereinater set forth.

It will be apparent that the present automatic parking meter structure is capable of operation on multiple coins of variable diameters and variable denominations and of coins of at least four in number, although not limited to this particular number. Coins of the United States of America have been utilized for exemplification of the various operations of the meter, however, it is to be understood that various size coins, as well as various denominations of any country may be utilized when desired. Furthermore, the meter contemplates modification of present day parking meters of this type, and particularly parking meters exemplified by the prior patents to G. A. Hale heretofore mentioned in that in addition to the penny and nickel operation of these prior patents, it will permit operation of the meter on a United States ten cent coin and also a twenty-five cent coin, or additional coins of variable sizes and denominations.

Upon release of the rotator plate 40 from the pin 53, movement of the coin will bring it into contact with the pin 71 (Fig. 1) to cause a movement of the arm 65 with a simultaneous movement of the re-set lever 70 (Fig. 8) in a counter-clockwise direction. The re-set lever 70 is similar to that described in applicant's co-pending application, Serial No. 565,855, heretofore mentioned, and comprises the elongated leg portion 72 cooperating with the larger cam portion 73. The leg 72 is provided with a plurality of recesses or undulations 74 (Fig. 8). It will be apparent that the levers 65 and 70 are preferably disposed on the front side of the plate 11 and the lever 70 is connected with a cam plate 76 disposed on the rear face of the plate 11 by suitable stud members 77 extending through an oddly shaped aperture 78 provided in the front plate 11 (Fig. 8). The cam plate 76 is fixed loosely mounted with the main shaft 25 through a suitable bearing 79 (Fig. 6). The re-set lever 70 in normal rest position is substantially at the angular disposition as shown in Fig. 8.

A freely rotatable shaft 80 is disposed in the upper portion of the meter mechanism between the plates 11 and 12 (Fig. 6) and the shaft 80 is loosely mounted in bearings 81 and 82 and an idler gear lever 83 is fixed on the shaft 80 providing connection with the gear train in a manner similar to that disclosed in the heretofore mentioned patents to G. A. Hale. A time indicating disc 84 (Figs. 1 and 6) is loosely mounted on the shaft 80 conterminous and parallel with the lever 83. The segment disc 84 is provided with a pointer or indicator 86 cooperating with the dial 31 in a manner similar to that of the heretofore mentioned patents and application. A substantial portion of the circumferential periphery of the disc 84 is provided with a plurality of gear teeth 88 for a purpose as will be hereinafter set forth. A freely rotatable idler gear 89 is secured to the lever 83 in any suitable manner and is adapted to mesh with the teeth 88 of the segment 84. The gear 89 also meshes with a gear 90 fixed on the shaft 29 (Fig. 6). The gear 90 is driven through the shaft 29, pinion 30, large segment 24a of the compound gear 24 and gear 20. The gear 90 is time controlled through the escapement mechanism 27 substantially in the manner as has been set forth in the previously mentioned patents, and applicant's co-pending application.

As clearly shown in Figs. 1 and 8, a stop indicating mechanism is loosely secured to the shaft 80 and disposed substantially adjacent or parallel to one side of the indicator segment 84. The indexing mechanism comprises the bell crank indexing lever 69 having the outwardly depending leg 69a carrying the stud pin 73. A second leg 69b is substantially oppositely disposed from the leg 69a and carries an inwardly directed flange portion 91 acting as a stop pawl or detent. The indexing lever 69 is pivoted on a stud 92 provided between the front and rear plates 11 and 12 respectively. A flange or extension 93 of the lever 69 is connected at one end of a helical spring 94 having the opposite end connected at 95 to the flanged arm 33 supporting the dial 31. It will be apparent that an opposite flanged arm 32 is provided, and the arms 32 and 33 are supported by the front plate 11 in turn supporting the dial 31 as shown. The spring 94 tends to urge the bell crank lever 69 and pawl 91 in a counter-clockwise direction. The pin 73 provided on the leg 69a is adapted to cooperate with the undulated portions 74 of the re-set lever 70 in a manner as will be hereinafter set forth. The apertured portion 78 of the front plate 11 permits extension of the pin 73 therethrough for contact with the undulated portions. The re-set lever 70 is disposed in front of the plate 11.

From Figs. 1, 6 and 8, it will be apparent that indexing mechanism also comprises a spider or ring member 98 supported on an apertured central web portion 99 which in turn is loosely mounted on the shaft 80 in parallel and conterminous relationship with the indicator segment 84. Support of the index ring 98 is provided by a plurality of holding dogs 100 carried by extension legs 101 of the web 99, and preferably spaced approximately one hundred twenty degrees apart (not shown) for assisting in holding the index ring 98 therewith. A clamping screw 102 (Figs. 4 and 8) is adapted to be threaded in an aperture (not shown) in the web 99, and is provided with an enlarged head portion overlapping the inner periphery of the index ring 98 for maintaining the ring in supported position relative to additional supporting dogs 100 (not shown). In this manner, the index ring 98 may be adjusted relative to the plurality of dogs 100 and then clamped in a fixed position relative to the spider by the screw 102.

Figure 4:
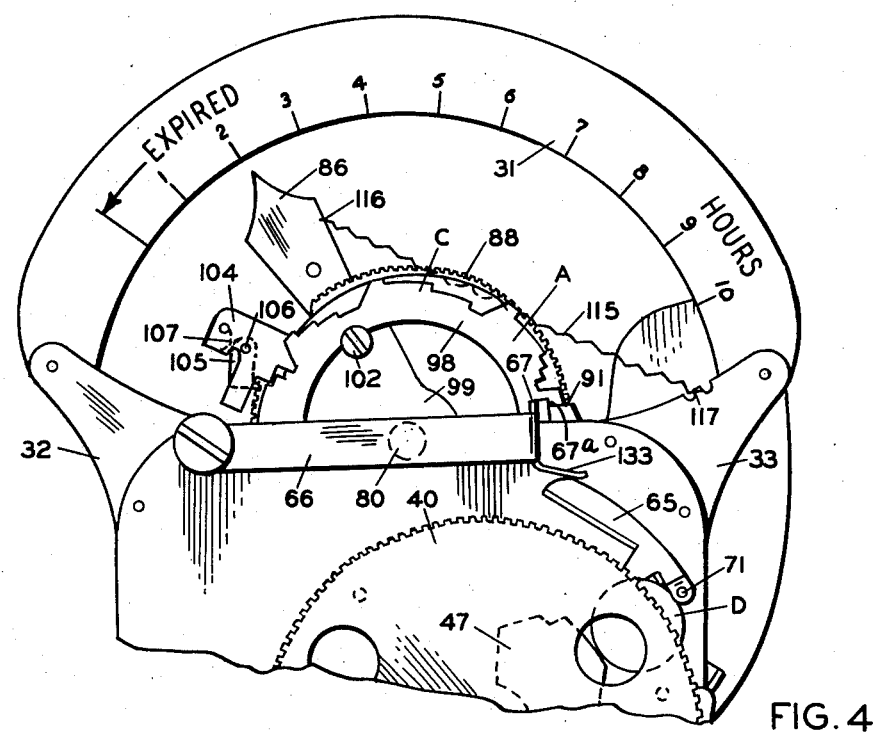
Figure 4 is a similar view for the operation of certain elements for the completion of the ten cent coin.

As is shown in Fig. 4, the web member 99 is provided with an extension leg 104 slightly arcuately spaced from the indicator 86 and is provided with a pawl member 105 pivotally secured thereto by a stud 106 and is urged in a counter-clockwise direction by a spring 107 in order to provide for cumulative indexing of the mechanism, all in a manner similar to that shown in applicant's prior application heretofore referred to. In addition, the meter mechanism is provided with a leaf cam 108 (Fig. 3) which is adapted to cooperate with the pawl member 105 which is normally maintained out of engagement with the teeth 88 of the segment 84 by the arcuate outer periphery 109 of the cam 108. The leaf cam 108 is provided with a lower extension leg (not shown) adapted to cooperate with the re-set lever 70 to cause movement of the cam 108 in a vertical direction to alternately permit and prevent engagement of the pawl 105 with the teeth 88, in a manner as described in applicant's co-pending application No. 565,855 heretofore mentioned. The leaf cam moves vertially simultaneously with movement of the re-set lever and when the re-set lever is in rest position as shown in Fig. 8, the arcuate periphery 109 of the cam contacts the pawl 105 to prevent engagement with the teeth 88. However, upon actuation of the lever 70 in a counter-clockwise direction as will be hereinafter set forth, the arcuate surface 109 is moved downwardly away from the pawl 105 to permit engagement thereof with the teeth 88 and thereby provide for cumulative indexing in a well known manner.

The operation of the meter is for a plurality of coins of the United States of America, namely the penny, nickel, dime and quarter. However, it is to be understood that the invention is not limited to such variations of coins and may be utilized with a greater number of coins, either in size or denomination and for any country. The indexing ring 98 is such that it will provide sufficient variations in time on the same ring for the same size coin. As will be apparent from Figs. 1 to 5, inclusive, and 10, the ring 98 comprises a plurality of radial shoulders arranged in a plurality of arcuate sectors wherein the rim or circumferential edge of each sector is formed with a plurality of shoulders with different radii with respect to the shaft 80. As will be noted in Figs. 1 and 8, the ring 98 is provided with a sector portion A having a plurality of shoulders or teeth of variable radii wherein the largest shoulder 110 is of the greatest radius relative to shaft 80, and represents the twenty-five cent United States coin, whereas the next shoulder or tooth 111 is of slightly shorter radius and represents the next closest coin of decreased value, or the ten cent coin. The shoulder 112 adjoining the shoulder 111 is of still shorter radius and represents the five cent United States coin, and the tooth 113 of even lesser radius represents the one cent coin.

Depicted to the right of sector portion A, according to Figs. 1 and 8, is another sector portion B wherein the quarter tooth 110 has been omitted. It being understood that omission of the quarter tooth may be made where larger time intervals on the meter are not required. The sector B is provided with a complementary ten cent tooth 111, five cent tooth 112, and the one cent tooth 113. In similar manner, the ring 98 to the left of sector A (Fig. 1) is provided with another sector portion C having a ten cent tooth 111, a five cent tooth 112, and a penny tooth 113. Here again the quarter tooth 110 has been omitted. It will be apparent from Figs. 1, 8 and 10 that the radius of a particular tooth for the same size coin in different sectors is constant, however, the arcuate length between the teeth is variable. The difference in length between the teeth in one sector or the other provides for different time values for a particular size coin. Consequently, the ring 98 may be adjusted to allow for variable sizes of time for one size of coin. By way of example, the ring 98 may be adjusted so that upon insertion of the nickel coin, it will permit either a long or short rotation of the ring 98 depending upon which sector is utilized, and the long or short rotation is relative to the position of the indicator 83 with the dial 31.

The time indicating dial 31 normally is provided with an arcuate spread or distance of substantially one hundred twenty degrees as shown, and the time indicia or calibrations thereon may be varied in intervals from ten minutes to ten hours. The dial of the present invention shows a ten hour scale, but is not limited thereto. Consequently, any adjustment of the ring 98 with its different sectors of teeth having variable spacing between the teeth for the variable size coins will permit a predetermined time interval as may be required. It will be apparent that the spacing between the penny tooth 113 and the nickel tooth 112 in sector B is much longer than the distance between the same teeth in sector A. Consequently, if the ring is adjusted for use of sector B, by way of illustration, the movement of the ring 98 will be through a greater arc for the indicator 86 and thereby provide a greater time interval on the dial 31 than that of the same coin tooth in sector A which is shorter and thereby provides a lesser throw or movement. For example, the movement in use of sector portion B may permit a fifteen degree arcuate movement of the indicator 86 relative to any calibration on the dial, whereas the movement with use of sector portion A may permit a seven and one-half degree or like movement. By further illustration, in reference to sector portion C, the distance between the penny tooth 113 and the nickel tooth 112 is greater than that in either sector portion A or B, thereby providing a greater throw, such as an arcuate movement through thirty degrees.

This consistency of the shoulder portions in each sector for a particular size coin is maintained throughout the ring 98 and the radius for a particular tooth complementary to a particular size of coin is the same regardless of the length of the arcuate spacing of a particular sector.

In the ten cent shoulder 111 in the sector C, it is the same radius as the ten cent shoulder in sectors B and A, although the arcuate spacing or width of the shoulder in sector C is quite wider or longer than that of sector B or A. When it is desired to utilize a particular sector, the indexing ring 98 is adjusted to properly position the indexing ring in the desired sector for cooperation with the indexing detent 91 in a manner as will be hereinafter set forth. It will thus be apparent that the indexing system provides an expeditious and versatile means of setting up desired time combinations for variable increments of time as is frequently required and specified in meter mechanisms. Considerable flexibility for various combinations is provided in order to adjust for substantially any combination desired for a particular sized coin.

Penny operation

Referring to Figs. 1, 3, and 8 and 9 disclosing a penny operation, it will be apparent that insertion of the penny coin P into the meter mechanism will move the trip lever 57 for releasing the coin rotator plate 40 so that one of the rotator pins may move the penny into contact with the cam surface 49 of the cam 47. Continued movement of the coin rotator plate 46 in a counter-clockwise direction will move the coin P into contact with the pin 71 of the lever 65, thereby causing movement of the lever 65 in a counter-clockwise direction with a simultaneous movement in the same direction of the re-set lever 70 (Fig. 8). Movement of the re-set lever 70 will release the index lever 69 and pin 73, thereby permitting movement of the detent 91 by spring 94 into a position for engagement with an on-coming tooth 113 for the coin P on the ring 98. It will be apparent that the periphery 109 of the leaf cam 108 has been moved away to permit engagement of the pawl 105 with the teeth 88 of the sector 84 so that the sector 84, indicator 86 and extension leg 106 are moved simultaneously in a clockwise direction under action of a helical spring 115 anchored at one end 116 to the indicator 86 and at the opposite end 117 to the flange 33. The throw or movement of the re-set lever 70 is complementary to the size of the coin P disposed between the pin 71 and the cam surface 49 in order to dispose the pin 73 in the undulated portions 74 and moving the detent 91 into the path of rotation of the index ring 98. As soon as the coin P moves past the cam surface 49, the pin 71 is disengaged from the coin P, thereby freeing the re-set lever 70 to return to rest position under action of the springs 118 and 119 (Fig. 8). The spring 118 is anchored to a pin 120 on the cam 76 and the opposite end 121 to the plate 11. In similar manner, the spring 119 is anchored to a stud 122 on cam 76 and its opposite end 123 to plate 11.

Upon return of the re-set lever to rest position, the indexing lever 69 and its detent 91 is moved in a clockwise direction out of the path of the indexing ring, whereupon the idler gear 89 engages the gear 90 to start the operation of the time by the timing mechanism 27 in the usual manner as has been previously set forth in the above referred to patents and applicant's co-pending application. Once the penny coin is moved away from the cam 47 it is continued to be moved by subsequent rotations of the rotator plate 40, thereby eventually deposited in the coin chute 124.

Figure 3:
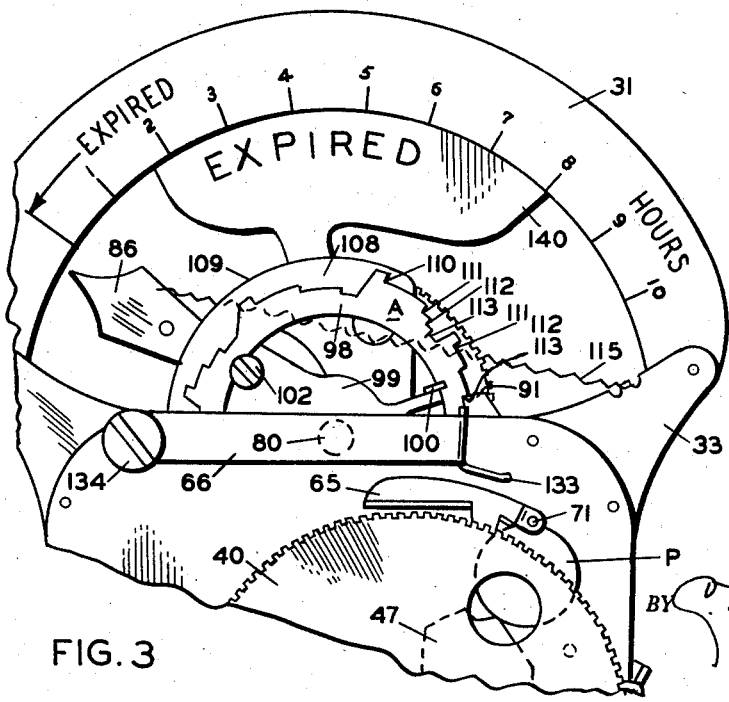
Figure 3 is a diagrammatic view in front elevation showing the position of some of the elements upon completion of the United States one cent coin movement.
Figure 5:
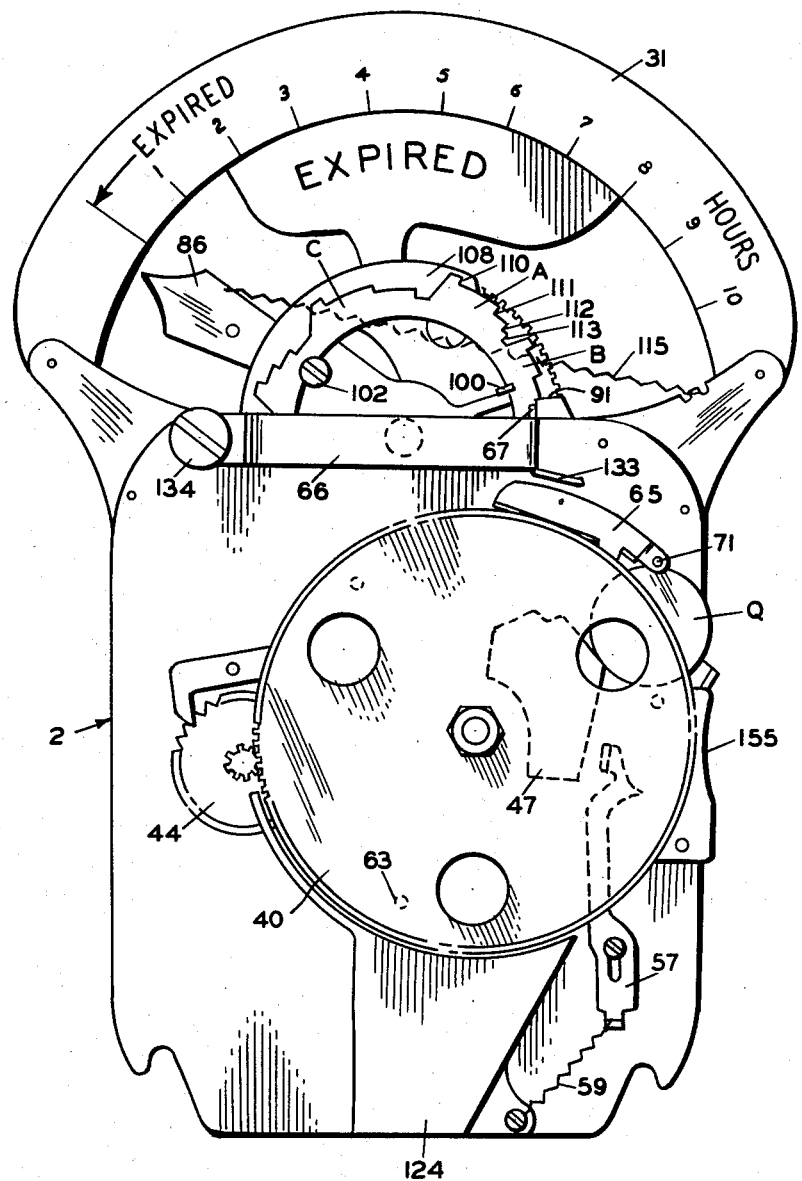
Figure 5 is a view similar to Fig. 1 showing the operation of certain elements in normal position upon initial insertion of a United States twenty-five cent coin.

Figure 1 depicts the initial position of the coin P and the detent 91 away from the tooth 113 of the ring 98. Figure 3 shows the coin P positioning the lever 70 in its maximum position for the penny and particularly the detent 91 engaging the tooth 113. The calibration of the dial 31 as depicted is such that the increment of time provided by the penny coin is very small.

Nickel operation

The operation of the meter mechanism for the United States five cent or nickel coin is substantially the same as that of the penny in that the nickel moves the re-set lever pin 71 in a slightly longer arcuate counter-clockwise direction to cause a slightly further throw or movement of the re-set lever 70 with a complementary further movement of the pin 73 into the undulations 74 on the re-set lever, thereby permitting movement of the indexing pawl 91 in a slightly further arcuate counter-clockwise direction for engagement with the ring 98 and the tooth or shoulder 112 complementary to the five cent coin.

Quarter operation

The operation of the mechanism for a twenty-five cent coin or quarter is a substantial duplication of the operation for a penny or nickel. As clearly shown in Fig. 5, the quarter coin Q of larger diameter operates in the same manner and will move the pin 71 and its complementary re-set lever 70 in a still longer arcuate counter-clockwise direction providing a greater movement of the index lever 69 and its pawl 91 for engagement with the quarter tooth 110. The movement of the indicator 86 is obviously through a greater arcuate distance relative to the dial 31 for the quarter operation, but again the amount of time received is relative to the calibrations on the dial 31.

Dime operation

Figure 2:
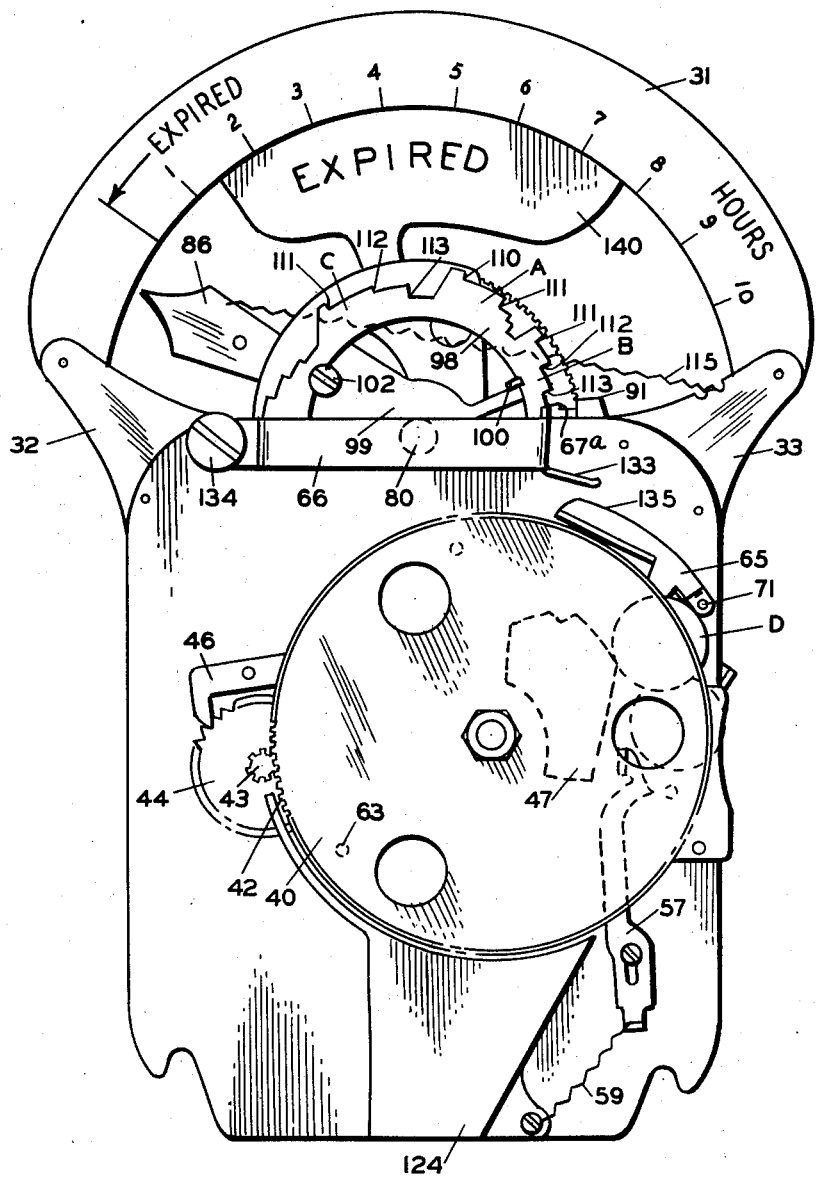
Figure 2 is a view similar to Fig. 1 and depicting the elements in normal position before the insertion of a United States ten cent coin.

The operation of the meter mechanism for a United States ten cent or dime coin is slightly different from the operation of the heretofore mentioned coins in the cooperation of the lever 65 with the smaller diameter of the ten cent coin. The movement of the dime or coin D from initial insertion as shown in Fig. 2 after release of the trip lever 57 along the cam 47 will bring the opposite peripheral edge of the coin D into contact with the flanged edge of the bracket member 130 of the lever 65 (Fig. 9) which is disposed in a shorter radius than the apertures 131 in which the pivot pin 71 is normally disposed for connecting the lever 65 with the re-set lever 70. The coin D will contact the bracket member 130 at the lowermost corner 132 in order to provide a simultaneous movement of the re-set lever 70 with that of the lever 65 in a counter-clockwise direction. The engagement of the coin D at the point 132 causes movement of the lever 65 in a different arcuate path from the movement provided by the previous penny, nickel or quarter coin operations. The arrangement is such that the contact at the point 132 will raise the lever 65 during its counter-clockwise movement, so that the lever 65 will engage with an extending lip or flange 133 on the freely pivotal lever 66. The lever 66 is pivoted at 134. As the upper surface portion 135 of the lever 65 moves under the flat lip 133, it will raise the pivotal lever 66 in a slightly counter-clockwise upward direction, thereby moving the inwardly disposed pawl 67 and the tooth 67a slightly upward into the path of movement of the detent 91. In this manner further movement of the detent 91 is momentarily blocked by the tooth 67a from the path of the index ring 98 and particularly the penny and nickel teeth 112 and 113, respectively. However, the detent 91 is disposed in the path of the ten cent coin tooth 111 on the ring 98 to provide for a proper indexing of the time requirement therefor. The blocking action for the detent 91 permits a sufficient lapse of time in operation of the index lever 69 until the ring 98 is rotated in a clockwise direction to bring the dime tooth 111 into a position for engagement with the detent 91. As soon as the coin D is moved past the cam 47, the re-set lever 70 is released to return to rest position under action of the springs 118 and 119 with a simultaneous return movement of the lever 65 thereby moving the curved surface 135 away from the extension 133 of the lever 66, whereupon the lever 66 and pawl 67 are moved back to their normal position out of the path of the normal operation of the index lever 69 and its detent 91.

From the foregoing, it will be apparent that the present invention contemplates a fully automatic parking meter mechanism capable of providing various selective increments of time through insertion of coins of variable size and denomination. The operation of the mechanism is such to provide a time registration through a plurality of coins of variable size and denomination, and particularly to provide a full registration of a coin of smaller diameter but of greater denomination than of some of the other coins utilized with the mechanism. The meter mechanism solves the problem of giving a full time registration for a United States dime coin, although smaller in diameter but greater in value than the penny and nickel presently utilized with multi-coin parking meters. The operation of the meter on the plurality of variable size coins may be accomplished without any sequential relationship between the length of parking time given for any one coin of the series or the value of the coin of the series, or the physical size of the coin of the series, and the meter may be adjusted for any desirable length of parking time in complement either to the size or denomination of the coin.

It will be further apparent that the novel indexing mechanism is so constructed and arranged to provide for indexing time for a plurality of different size coins of different denominations and is adjustable to set up variable time increments for the same size coin, depending upon the particular time requirements, thereby providing considerable flexibility for numerous time combinations on the plurality of variable size coins. In addition, with insertion of a dime coin of small diameter, the meter mechanism is precluded from registering any time upon movement of the penny coin and nickel coin teeth of the indexing mechanism by blocking out any action of the cooperating detent of the indexing mechanism until the tooth corresponding to the dime coin is brought into position for engagement with the detent. In this manner, coins of smaller diameter, but of larger denomination, may be utilized in a series of variable coins of almost any size or denomination.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In an automatic parking meter for receiving multiple coins of varying diameter and denomination and comprising an indicator movable relative to a time scale, a clock works for driving the indicator in one direction relative to the scale, means for moving the indicator in a direction opposite to the first mentioned direction, an indexing mechanism for determining a selected period of time having alternate engagement and disengagement with the indicator, a coin rotator, means responsive to the insertion of the coin for tripping the rotator to permit rotation thereof, means for carrying the coin with the rotator, a pivotal re-set lever movable by the coin carried by the rotator and responsive to the size of the coin for movement into a pre-determined position, pivotal detent means cooperating between the re-set lever and the indexing mechanism and responsive to movement of the re-set lever for setting the indicator at a position on the time scale dependent upon the size of the coin, a coin lever cooperating with the re-set lever through contact with the inserted coin and permitting utilization of a coin of smaller diameter but greater denomination than some of the other variable size coins of the multiple coins, a pivotal lever having a pawl at one end thereof, said pivotal lever responsive to engagement by the coin lever upon actuation of the re-set lever by insertion of said coin of smaller diameter to move the pawl into the path of the detent and block out cooperation of the detent means with the indexing means until movement of the indicator to a pre-determined position.

2. In an automatic parking meter for receiving multiple coins of varying diameter and denomination and comprising an indicator movable relative to a time scale, a clock works for driving the indicator in one direction relative to the scale, means for moving the indicator in a direction opposite to the first mentioned direction, an indexing mechanism for determining a selected period of time having alternate engagement and disengagement with the indicator segment, a coin rotator, means responsive to the insertion of the coin for tripping the rotator to permit rotation thereof, means for carrying the coin with the rotator, a pivotal re-set lever movable by the coin carried by the rotator and responsive to the size of the coin for movement into a predetermined position, pivotal detent means cooperating between the re-set lever and the indexing mechanism and responsive to movement of the re-set lever for setting the indicator at a position on the time scale dependent upon the size of the coin, a coin lever freely pivotal at one end of the re-set lever and movable therewith, said coin lever adapted to cooperate with a coin of smaller diameter but of greater denomination than a portion of the other variable sized coins of the multiple coins by contacting the smaller sized coin carried by the coin lever to cause simultaneous movement of the coin lever and the re-set lever, said coin lever having an upper flange member adapted to be moved slightly upward upon contact by smaller sized coin, said flange member movable in an arcuate path simultaneous with the coin lever and the re-set lever, a pivotal lever having a pawl provided at one end thereof, an angled extension provided on the pivotal lever adjacent the pawl, said extension adapted to be contacted during the upward movement by the flange member of the coin lever during movement thereof to move the pivotal lever and its pawl in front of the detent for blocking out engagement of the detent means with the indexing means until movement of the indexing means into a pre-determined position.

3. In an automatic parking meter for receiving a plurality of coins of at least two different sizes and denominations to indicate a period of time and comprising an indicator alternately movable in opposite directions relative to a time scale, a clock works for driving the indicator in one direction relative to the scale, coin control means movable in response to coin insertion for releasing the indicator for movement in an opposite direction to the first mentioned direction, detent means cooperating with the coin means for controlling the movement of the indicator in the last mentioned direction, an indexing mechanism movable with the indicator and adapted to be engaged by the detent means for stopping the movement thereof at a pre-determined position, said indexing means having an indexing ring having a plurality of teeth provided thereon wherein each tooth is complementary to a particular sized coin, a coin lever carried by the coin control means and movable simultaneous therewith, said coin lever responsive to an inserted coin of smaller diameter but of greater denomination than at least one of the inserted coins for moving the coin lever upwardly, a pivotal lever having a lip extension thereon disposed in the path of the upwardly moving coin lever for causing vertical pivoting of the pivotal lever, pawl means on one end of the pivotal lever upon vertical pivotal movement thereof disposed in the path of the detent means for blocking out the detent means from engagement with a portion of the teeth on the index ring.

4. In a cumulative re-set mechanism for automatic power driven parking meters capable of receiving at least three coins of varying diameters and denomination and comprising an indicator disc releasable to move in one direction relative to a time scale, an indexing ring adapted to be locked with the indicator disc for simultaneous movement thereof in said direction, detent means movable in the path of the movable indexing means for limiting the movement of the indexing means and its complementary indicator disc in said direction, a pivotal lever adapted for movement into the path of the detent means, a plurality of teeth of variable radius provided on the indexing ring wherein each tooth is complementary to a particular size coin, and selectively movable means responsive to insertion of a coin of the smallest diameter of the multiple coins for moving the pivotal lever into a position preventing engagement of the detent means with a portion of the teeth on the indexing ring yet providing for subsequent engagement of a particular tooth for the coin of smallest diameter.

References Cited in the file of this patent

UNITED STATES PATENTS

| | | |
|---|---|---|
| 2,563,182 | Michaels | Aug. 7, 1951 |
| 2,625,250 | Hale | Jan. 13, 1953 |
| 2,721,641 | Eames | Oct. 25, 1955 |